US011993332B2

(12) United States Patent
Carlier (10) Patent No.: US 11,993,332 B2
(45) Date of Patent: May 28, 2024

(54) BICYCLE WITH LIGHT SYSTEM, BICYCLE CASSETTE AND METHOD

(71) Applicant: MA Micro Limited, Woking (GB)

(72) Inventor: Ties Jonan Midas Carlier, Amsterdam (NL)

(73) Assignee: MA Micro Limited, Woking (GB)

( * ) Notice: Subject to any disclaimer, the term of this patent is extended or adjusted under 35 U.S.C. 154(b) by 0 days.

(21) Appl. No.: 17/048,898

(22) PCT Filed: Apr. 17, 2019

(86) PCT No.: PCT/NL2019/050225
§ 371 (c)(1),
(2) Date: Oct. 19, 2020

(87) PCT Pub. No.: WO2019/203643
PCT Pub. Date: Oct. 24, 2019

(65) Prior Publication Data
US 2021/0237820 A1    Aug. 5, 2021

(30) Foreign Application Priority Data

Apr. 17, 2018  (NL) ........................................ 2020781

(51) Int. Cl.
*B62J 50/22*   (2020.01)
*B62J 6/029*   (2020.01)
(Continued)

(52) U.S. Cl.
CPC ............... *B62J 50/22* (2020.02); *B62J 6/029* (2020.02); *B62J 6/04* (2013.01); *B62J 6/056* (2020.02);
(Continued)

(58) Field of Classification Search
CPC . F21S 43/15; F21W 2104/00; F21W 2107/13; F21Y 2107/30; B62J 6/24;
(Continued)

(56) References Cited

U.S. PATENT DOCUMENTS 5,008,782 A  *  4/1991  Murray .................... B62J 6/029
                                                        74/551.8
5,823,653 A  *  10/1998  Elam, Jr. .................... B62J 6/01
                                                        362/473
(Continued)

FOREIGN PATENT DOCUMENTS

CN       105378434 A      3/2016
CN       106043519 A      10/2016
(Continued)

*Primary Examiner* — Zheng Song
(74) *Attorney, Agent, or Firm* — The Webb Law Firm (57) ABSTRACT

The present invention relates to a bicycle with light system. The bicycle includes a tube assembly including a frame with mutually fixed tube elements with a tube wall and movable tube elements, such as a steering pin and a handlebar, a light generation subsystem including at least one independently controllable light source for generation of light, a light control for controlling the light generation subsystem for providing at least one light effect, and a light guiding subsystem for guiding light over a part of the path between the at least one light source and the surroundings of the bicycle. The at least one light source is arranged in at least one of the at least one tube element. The bicycle includes the at least one opening in at least one tube element for passing the light through the tube wall. The light guiding subsystem provides a guiding from the inside of the respective at least one tube element to the outside of the at least one tube element of the frame.

15 Claims, 6 Drawing Sheets

(51) Int. Cl.
   *B62J 6/04* (2020.01)
   *B62J 6/056* (2020.01)
   *B62J 6/24* (2020.01)
   *B62J 50/21* (2020.01)
   *F21S 43/15* (2018.01)
   *F21W 104/00* (2018.01)
   *F21W 107/13* (2018.01)
   *F21Y 107/30* (2016.01)

(52) U.S. Cl.
   CPC .............. *B62J 6/24* (2020.02); *B62J 50/225* (2020.02); *F21S 43/15* (2018.01); *F21W 2104/00* (2018.01); *F21W 2107/13* (2018.01); *F21Y 2107/30* (2016.08)

(58) Field of Classification Search
   CPC ..... B62J 6/056; B62J 6/04; B62J 6/029; B62J 6/01; B62J 50/22; B62J 50/0035
   See application file for complete search history.

(56) References Cited

U.S. PATENT DOCUMENTS

| | | | | |
|---|---|---|---|---|
| 9,610,994 | B2* | 4/2017 | Peterson | B62J 6/015 |
| 9,944,339 | B2* | 4/2018 | Poole | B62J 6/01 |
| 11,014,623 | B2* | 5/2021 | Yun | H05B 47/115 |
| 2004/0090040 | A1* | 5/2004 | Pearson | B62J 29/00 |
| | | | | 280/288.4 |
| 2004/0095776 | A1* | 5/2004 | Pisula | B62J 6/00 |
| | | | | 362/473 |
| 2004/0141316 | A1* | 7/2004 | Twardawski | B62J 6/029 |
| | | | | 362/244 |
| 2008/0002417 | A1 | 1/2008 | Mohr | |
| 2009/0080207 | A1* | 3/2009 | Hurwitz | B60Q 1/32 |
| | | | | 362/464 |
| 2010/0182797 | A1* | 7/2010 | Wells | F21V 21/08 |
| | | | | 362/474 |
| 2010/0283590 | A1* | 11/2010 | Tee | B62J 6/01 |
| | | | | 340/432 |
| 2011/0156894 | A1 | 6/2011 | Lin et al. | |
| 2012/0275142 | A1* | 11/2012 | Lundy | F21L 4/027 |
| | | | | 362/184 |
| 2013/0033883 | A1* | 2/2013 | Ward | B62K 21/12 |
| | | | | 362/474 |
| 2015/0085508 | A1* | 3/2015 | McConathy | B62J 6/015 |
| | | | | 362/473 |
| 2015/0146449 | A1* | 5/2015 | Freiser | F21V 21/08 |
| | | | | 362/523 |
| 2016/0086577 | A1 | 3/2016 | Broadbent et al. | |
| 2016/0144917 | A1* | 5/2016 | Clyde | B62J 6/01 |
| | | | | 362/398 |
| 2016/0362154 | A1 | 12/2016 | Poole | |
| 2017/0106929 | A1* | 4/2017 | Deckard | B62J 1/28 |
| 2018/0017241 | A1* | 1/2018 | Grider | F21V 23/06 |
| 2018/0134335 | A1* | 5/2018 | Rudys | B62J 6/02 |
| 2019/0061855 | A1* | 2/2019 | Ebrahemi | B62K 19/40 |
| 2020/0010136 | A1* | 1/2020 | Yun | H05B 47/115 |
| 2020/0039594 | A1* | 2/2020 | Ebrahemi | B62K 19/40 |
| 2020/0346704 | A1* | 11/2020 | Mochizuki | B60Q 9/008 |

FOREIGN PATENT DOCUMENTS

| | | |
|---|---|---|
| JP | H4131540 U | 12/1992 |
| JP | 3126643 U | 11/2006 |
| JP | 2009119993 A | 6/2009 |
| WO | 2005020731 A1 | 3/2005 |

* cited by examiner

BICYCLE WITH LIGHT SYSTEM, BICYCLE CASSETTE AND METHOD

CROSS-REFERENCE TO RELATED APPLICATIONS

This application is the United States national phase of International Application No. PCT/NL2019/050225 filed Apr. 17, 2019, and claims priority to The Netherlands Patent Application No. 2020781 filed Apr. 17, 2018, the disclosures of which are hereby incorporated by reference in their entirety.

BACKGROUND OF THE INVENTION

Field of the Invention

The present invention relates to a bicycle with light system for providing of at least one light effect. Furthermore, the present invention relates to a bicycle tube cassette for arrangement thereof in a bicycle tube with a light generation subsystem for providing of at least one light effect. Furthermore, the present invention relates to a method for providing of a light system from a bicycle.

Description of Related Art

A bicycle with lighting is generally known. Bicycles have been provided with a front light and/or a rear light for years for the purpose of safety. Such lighting exists in many shapes and sizes for mounting to a bicycle.

SUMMARY OF THE INVENTION

The present inventor came to insights that led to insights that new functionalities relating to light at a bicycle are desirable. In order to prove provides such new functionalities, the present invention provides a bicycle with light system, the bicycle comprising:
- a tube assembly comprising a frame with mutually fixed tube elements with a tube wall and movable tube elements, such as a steering pin and a handlebar,
- a light generation subsystem comprising at least one independently controllable light source for generation of light,
- a light control for controlling of the lights generation subsystem for providing of at least one light effect,
- a light guiding subsystem for guiding of light over a part of the path between the at least one light source and the surroundings of the bicycle,
- wherein the at least one light source is arranged in at least one of the at least one tube element,
- at least one opening in at least one tube element for passing through of the light through the tube wall, and
- wherein the light guiding subsystem provides a guiding from the inside of the respective at least one tube elements to the outside of the at least one tube element of the frame.

Advantageously, the present invention provides a light function to the bicycle with a character bound to the frame. For the user or other spectators of the bicycle, a high attention value is provided with a specific functionality perlite effect. In other words, in an advantageous manner, a lighting effect is provided to the frame of the bicycle. Advantageously, the lighting effect is preferably so advanced that the effect of a screen integrated in the frame is provided. With this, it is advantageously realized that by means of the light function of the bicycle feedback relating to functions of the bicycle or subsystems of the bicycle can be provided to the writer of the bicycle in a way that it is coupled to the frame.

In a further advantageous manner, it is here with realized that the lighting function is very robust. By the arrangement of the light generation system in a tube element of the bicycle, a risk of damaging thereof by external influences is strongly minimized. Furthermore, the energy supplied to the light generation system is similarly protected.

According to a first preferred embodiment, the at least one opening comprises a number of openings in an array or in a grid pattern, providing a two-dimensional matrix, preferably in a curved surface in case of the arrangement in a frame tube with a curved surface. With this, in an advantageous manner, a display function is realized. Information is preferably transferred to the user by means of such a display function. Furthermore, information is contemplated to other persons in the environment by means of such a display function.

According to a further preferred embodiment, the light generation subsystem is arranged for generating graphical and/or text representations by means of a number of independently controllable light sources, preferably functioning as a matrix display or dotmatrix display. According to the invention or preferred embodiments thereof, such a display function may be realized to a bicycle, a frame or tube elements thereof in a manner that is very robust and unique. A relatively large display may be realized without thereto known risks of vulnerability of an external display. An external display to a bicycle with such a size would be vulnerable, especially sideways directed services thereof that would bump into objects in the environment during use thereof. This advantage is present for virtually all described preferred embodiments distinctly.

According to a further preferred embodiment, the light generation subsystem or a part thereof is arranged in at least one cassette that is arrangeable in a respective tube element, such as a bicycle cassette for insertion thereof in the top tube. With application of such a cassette, manufacturing of a bicycle comprising a light functionality according to the present invention is performed in an advantageous manner. Furthermore, maintenance or replacement may be performed in an advantageous manner by removing of the cassette thereafter, after repair, the cassette may be replaced in a simple manner.

According to a further preferred embodiment, of the light generation subsystem, a number of light sources is arranged in an array or grid pattern, wherein these are preferably directed toward an inner surface of the respective tube element. With this, in an alternative manner, a display function with several lines is advantageously realized.

According to a further preferred embodiment, the light guiding subsystem comprises a number of light guiding elements and/or lenses, preferably arranged at or in an opening of the respective tube elements. With this, the light may be passed through an opening in the tube element in an optically predetermined manner. With this, the reliability of the perception of the light is determinable beforehand and the manner in which the light function is perceived by the user or bystanders advantageously defines.

For the purpose of a covering or physical protection, further preferably a cover element for covering of at least a part of the openings and/or light guiding elements is provided.

Alternatively, it is provided that the lights generation subsystem is arranged for irradiating the inside or the inner surface of a tube element, or a part or a segment thereof, for passing through of the irradiated light through the openings. With this, a light effect is advantageously realized by all irradiated openings. Such a preferred embodiment is for instance advantageous for an indicator function in for example a front stay, be a stay or handlebar.

According to a further preferred embodiment, the light function preferably comprises a light effect comprises at least one of: continuous illumination, alternating illumination, an animation, such as a ticker effect; as well as information elements for the purpose of for example a contact lock function, wheel lock function such as for locking and unlocking, bell function, horn function, engine level, startup sequence, feedback for the purpose of a code input sequence and, charging function for a battery, error function, switching on of an alarm, switching off of an alarm, alarming in the event of actions by persons assessed as such. With this, arrange of advantageous light effects is provided with each a practical attention value for the spectator.

According to a further preferred embodiment, the bicycle comprises a control unit arranged for receiving of bicycle information of at least one subsystem of the bicycle, such as a speedometer, wherein the control unit is configured and/or programmed to assemble input information for the light generation subsystem or the light control for generating light and/or light effects by the light generation system in accordance with the input information. Because of this, light effects are provided to the bicycle for generating graphical and text information in reaction to information coming from at least such a subsystem. Further examples of information for displaying thereof are indicated in other parts of this description.

Further preferably, the bicycle comprises configuration means or program code means for rendering of feedback information relating to a subsystem, at least one of: a charge of a drive battery, status of a bicycle lock, status of a contact lock function, status of an alarm function, status of a tachometer, such as of a bottom bracket, and/or a status of connection functions such as of a network connection such as a connection via a telephone network or a Bluetooth network.

For the purpose of further effects of the light function, further preferred embodiments provide a light generation system in at least a top tube, bottom tube, settle tube, France day, rear stay such as a rear upper stay or a rear bottom stay, and/or a handlebar. Further preferably, the light function provides an alarm function, indicator function, animation function, front light function, rear light function, navigation function, and/or a notification function.

For the purpose of a flexible application of the bicycle cassette in tube elements with varying length, the bicycle cassette further preferably comprises a main part for arrangement in several types of bicycles, preferably comprising a cassette contact for connection with a connector contact for a bicycle connector arranged in the respective tube element. For the purpose of for example additional length of a tube element for therein applying of the cassette, the cassette is further preferably connectable with a sub cassette for providing of a further functionality to the bicycle cassette, such as a rear light or a clamp for a saddle pin. With this, it is advantageously realized that a main part with for example a therein arranged moon light generation subsystem and/or a control unit for the bicycle is applicable in several tube elements of for example different types of bicycles. With this, the front part of the bicycle cassette to be formed is formed by the main part.

According to a further preferred embodiment, the light generation system comprises a wedge shaped or tapered surface, preferably for Corporation with a corresponding wedge shaped or tapered surface of the light guiding subsystem. With this, it is advantageously achieved that the light generation subsystem and the light guiding subsystem are arranged against each other with a minimal in between space or virtually direct contact. This is advantageous for the quality of the light effect of the light function.

For the purpose of a cover of the light guiding system and/or the outside of the tube element, a ceiling file is preferably arranged at the outside of the tube element at the location of the light generation subsystem. With this, a protection of the light function and respective subparts therefore is realized.

For the purpose of ceiling of a space of play between the light guiding subsystem and respective openings in a respective tube elements, preferably a ceiling means, such as a kit or a glue means is provided.

Further preferably, the light function functions as a display arranged in the surface of a tube elements.

A further aspect according to the present invention relates to a bicycle cassette for arranging thereof in a tube element for a bicycle with light system, preferably according to one or more of the preceding claims, comprising a light generation system comprising at least one independently controllable light source for generation of light, such as for Corp. with a light guiding subsystem for guiding of the light over a part of the path between the at least one light source and the surroundings of the bicycle. Such a bicycle cassette provides advantages as described in relation to the preceding aspect according to the present invention.

Further preferably, such a bicycle cassette comprises a light control for controlling of the light generation subsystem for providing of at least one light effect, suitable for coupling with a bicycle control unit in connection with at least a bicycle subsystem. Further preferably, such a bicycle cassette comprises a control unit for the bicycle.

Further preferably, such a bicycle cassette comprises the light generation subsystem comprises a wedge shape or tapered surface, preferably for Corporation with a corresponding wedge shaped or tapered surface of the light guiding subsystem. Further preferably, such a bicycle cassette comprises one or more features according to one or more of the claims one through 19, preferably arranged in a bicycle according to the present invention.

BRIEF DESCRIPTION OF THE DRAWINGS

Further advantages, features and details of the present invention will be further elucidated on the basis of a description of one or more preferred embodiments with reference to the accompanying figures. Similar yet not necessarily identical parts of different preferred embodiments may be indicated with the same reference numerals.

DESCRIPTION OF THE INVENTION

A first preferred embodiment (FIG. 1) according to the present invention relates to a bicycle with light function 1. It comprises a matrix display 3 in top tube 2. The matrix display is created by means of openings 4 in the top tube.

A cassette 11 for arrangement thereof in the top tube has a display module 12 comprising a number of components 13-16. The display module 12 comprises a bottom housing 13 and a top housing 16. In between, a control unit 14 for controlling of the LEDs of the LED module 15 arranged above, preferably embodied flexibly, further preferably integrated on a flexible PCB.

The LEDs 24 of the LED module 15 correspond with the openings for in the top tube to for providing of the display 3. The display is formed by a grid of the LEDs 24, and this case for example 169 for providing of a number of graphical and/or light effects. The number of LEDs is sufficient for providing a graphical representation or a text representation of information towards the user. The graphical and textual representation is generated by a control unit that is also arranged in the cassette and that is in communication with subsystems of the bicycle. Such subsystems comprise a bicycle lock, a bicycle motor, a ref counter, a bell button or a contact lock function. Based on information from these subsystems, the control unit assembles display information for the display thereof on the display.

A light guiding unit 17 comprises a base 19 with light guiding members or lenses 26 extending therefrom that corresponds with each LED of the LED module 15. Each light guiding member or lens 26 extends through a respective opening for in the top tube for guiding of light of the LEDs to the outside of the tube and for as such making this light visible.

At the inside of the tube, an amount of kit or a glue for water tight ceiling of the through openings 4 of the top tube is arranged. The cassette is inserted sideways in the direction of the arrow a into the top tube. The bottom side of the light guiding unit 17 and the top side of the housing 16 is tapered by means of cooperating services 28 for the purpose of a good contact between the LEDs and light guiding elements.

Figure 1:
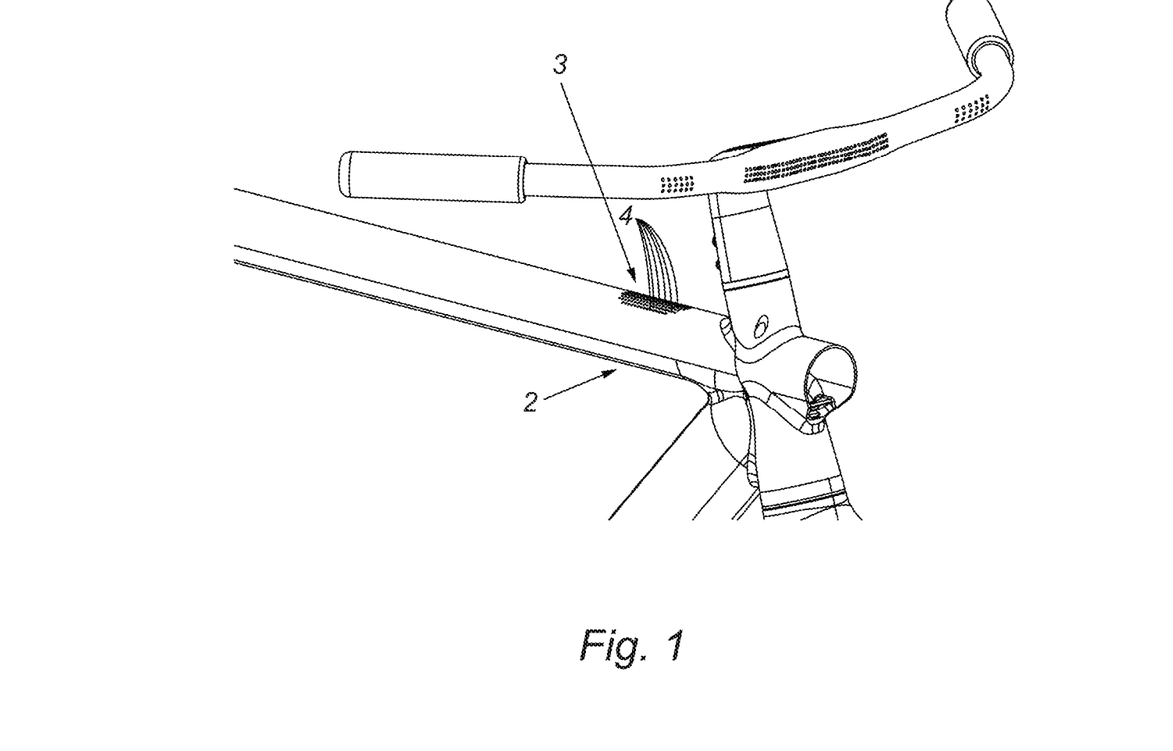
FIG. 1 relates to a representation in perspective view of a first preferred embodiment according to the present invention.
Figure 2:
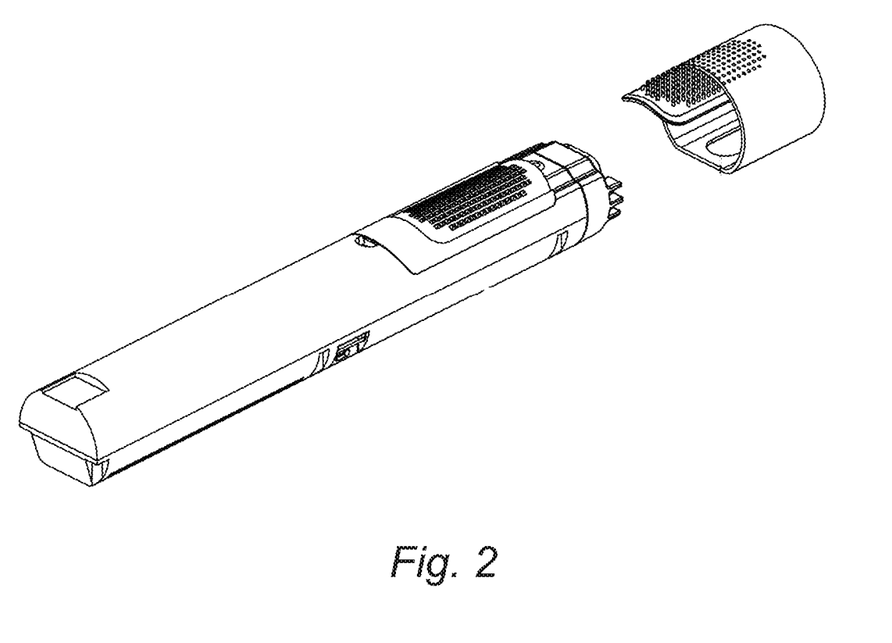
FIG. 2 relates to an exploded representation in perspective view of a preferred embodiments.
Figure 3:
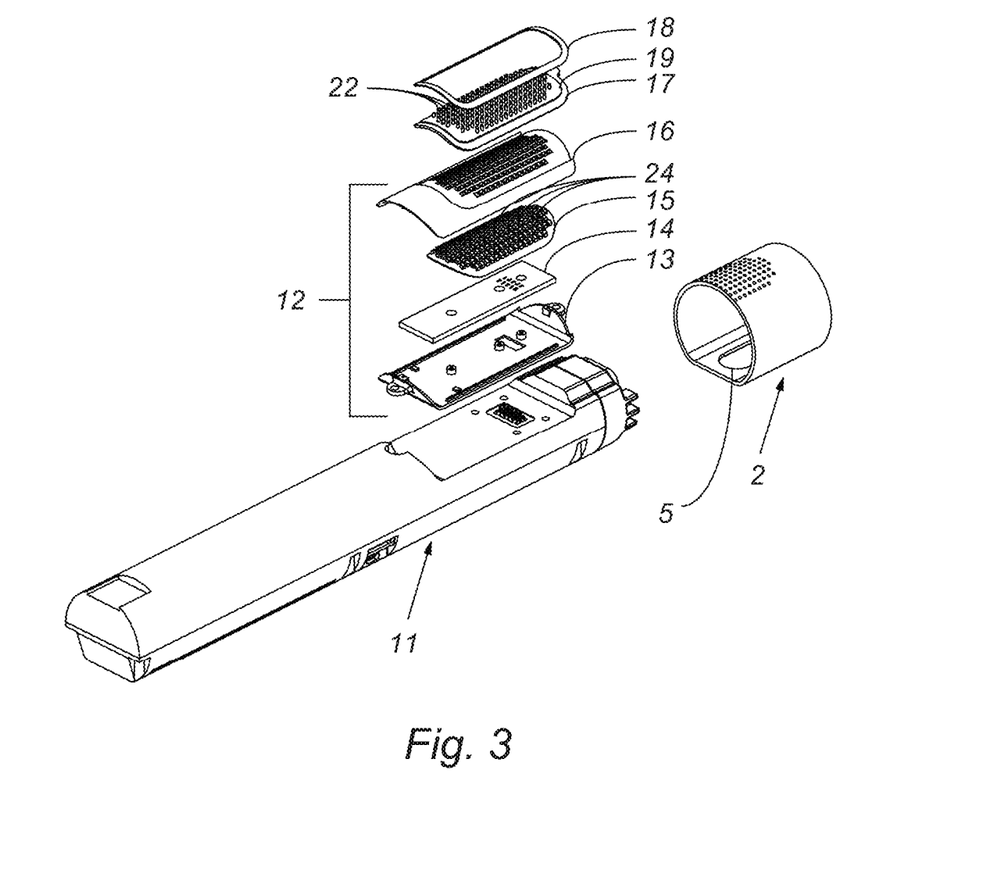
FIG. 3 relates to an exploded representation in perspective view of the preferred embodiment according to FIG. 2.
Figure 4:
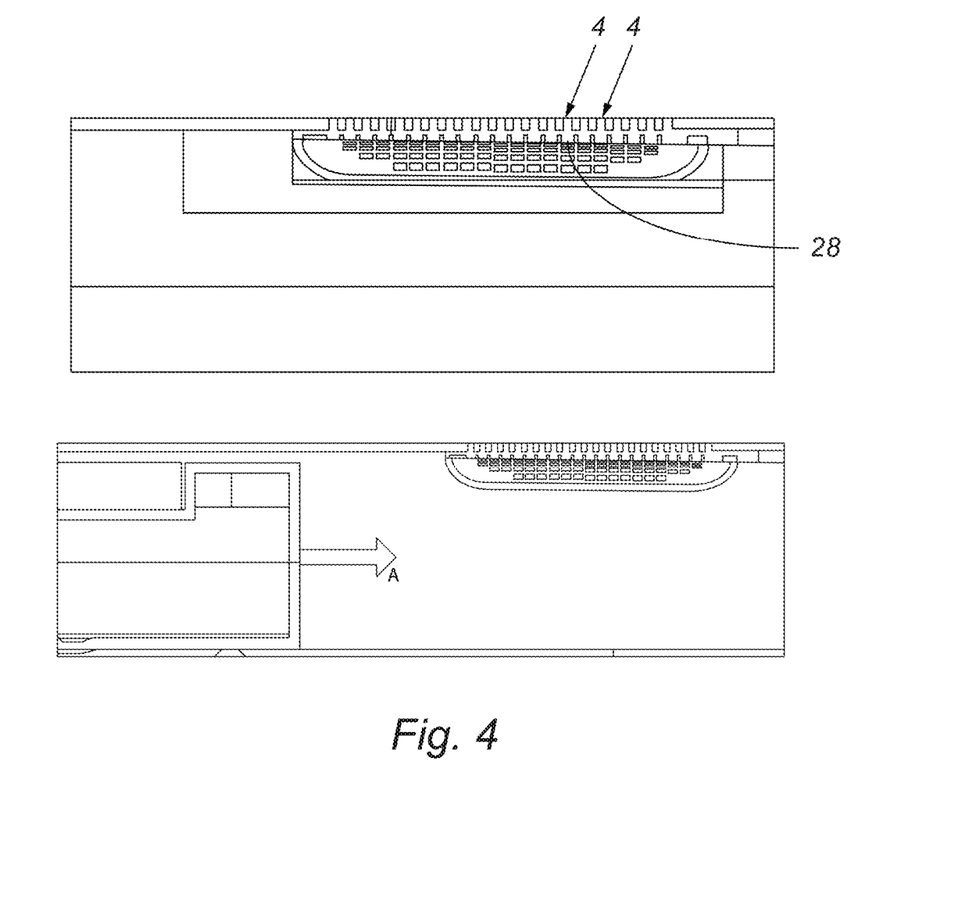
FIG. 4 relates to side views of a schematic representation of a preferred embodiment.
Figure 5:
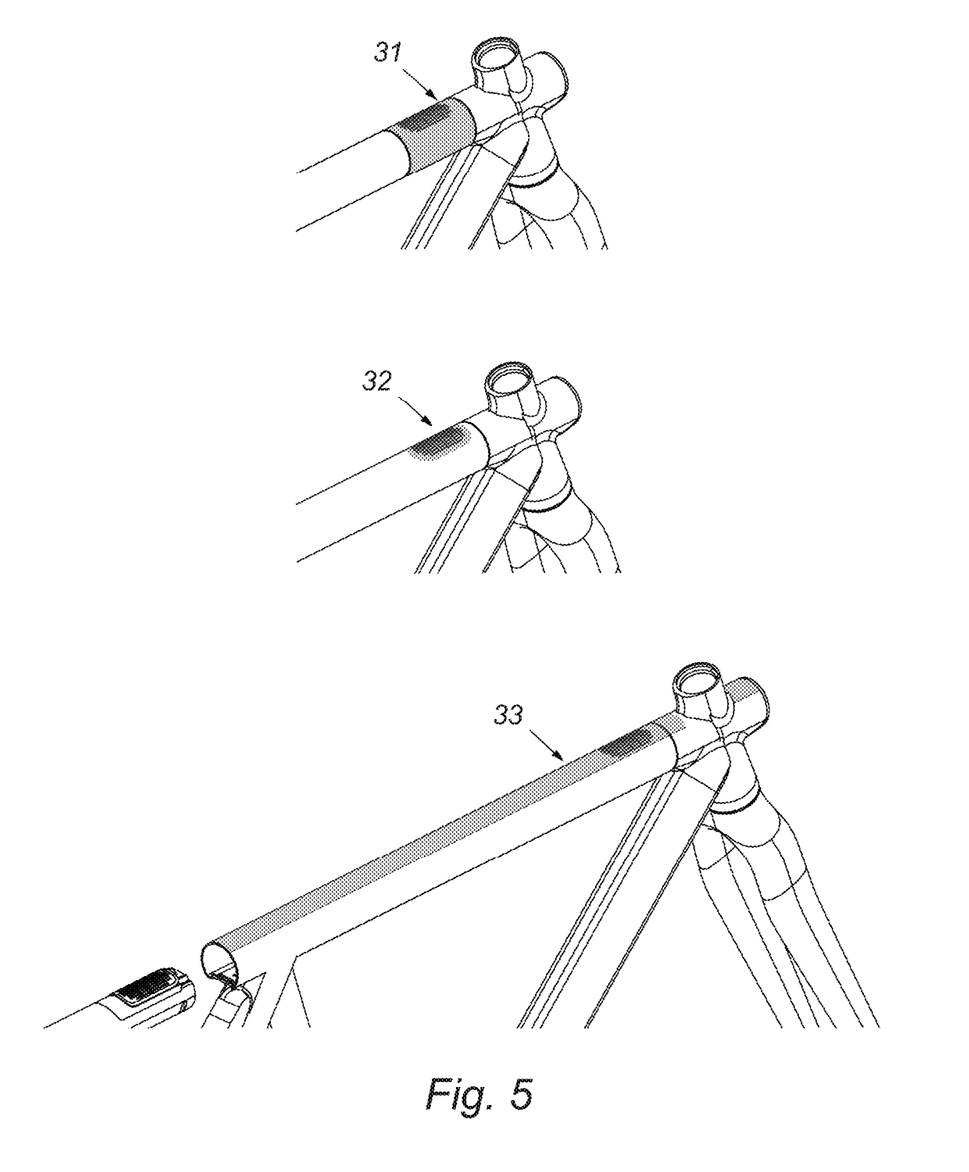
FIG. 5 relates to a representation in perspective view of further preferred embodiments.
Figure 6:
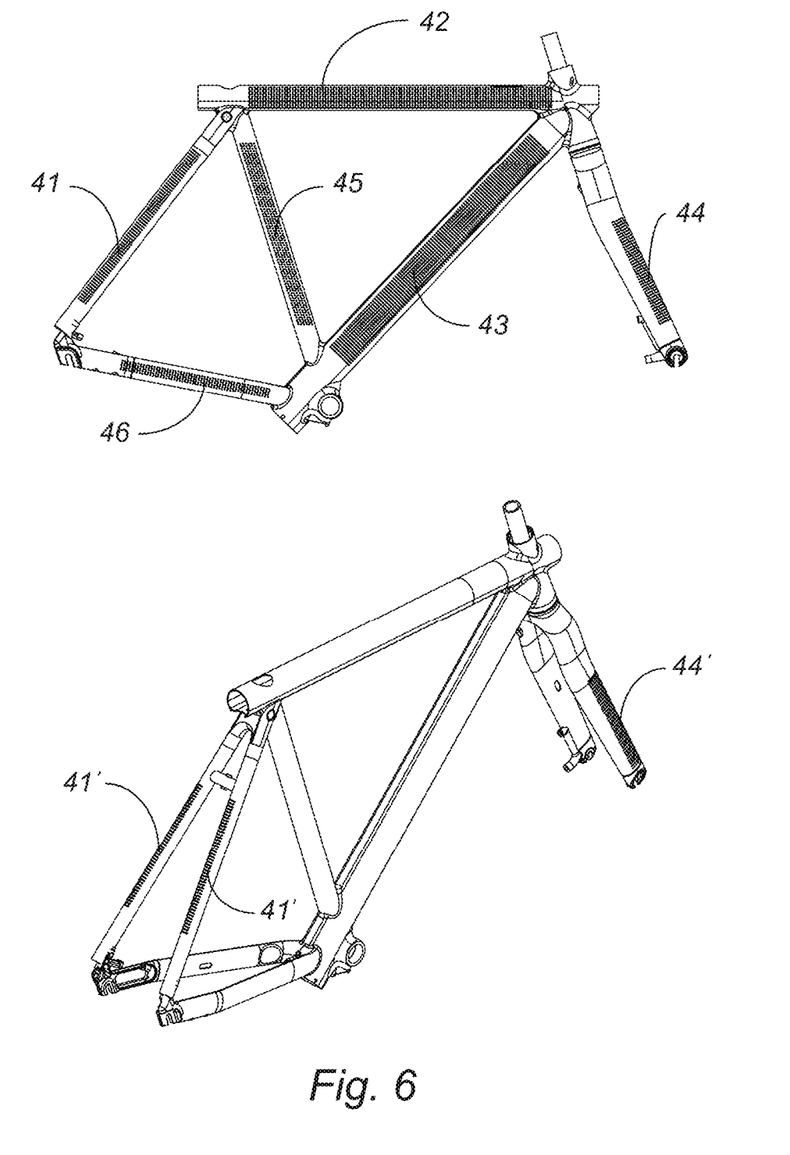
FIG. 6 relates to views of a further preferred embodiment.

Alternative arrangements of the light function and/or display function according to the present invention relates to such a function in the handlebar 46 (FIG. 1). Furthermore, such a display and/or lighting is considered in the front state 44, real estate 41, rear bottom state 46, settled tube 45 and bottom tube 43. This is considered as both a display according to FIG. 1-5 and as a more general illumination from the inside of the tube with through illumination through openings through the respective tube.

A further aspect according to the present invention relates to a bicycle with bicycle display, the bicycle comprising:
a tube assembly comprising a frame with mutually fixed tube elements with a tube wall and movable tube elements, such as a steering pin and a handlebar,
a light generation subsystem comprising a number in a grid pattern arranged, independently controllable, light sources for generation of light,
a light control for controlling of the lights generation subsystem for providing of at least one light effect,
a light guiding subsystem for guiding of light over a part of the path between the at least one light source and the surroundings of the bicycle,
wherein the at least one light source is arranged in at least one of the at least one tube element,
at least one opening in at least one tube element for passing through of the light through the tube wall, and
wherein the light guiding subsystem provides a guiding from the inside of the respective at least one tube element to the outside of the at least one tube element of the frame for realizing of a graphical and/or text representation by the light sources within the grid pattern.

The present invention is described in the foregoing on the basis of preferred embodiments. Different aspects of different embodiments are expressly considered disclosed in combination with each other and in all combinations that on the basis of this document, when read by a skilled person of the area of skill, fall within the scope of the invention or are deemed to be read with the disclosure of this document. These preferred embodiments are not limitative for the scope of protection of this document. The rights sought are defined in the appended claims.

The invention claimed is:

1. A bicycle with light system, the bicycle comprising:
a tube assembly comprising a frame with mutually fixed tube elements with a tube wall and movable tube elements,
a light generation subsystem comprising a plurality of independently controllable light sources for generation of light,
a light control for controlling of the light generation subsystem for providing of at least one light effect,
wherein at least one light source is arranged in at least one of the at least one tube element, and
wherein the light guiding subsystem provides a guiding from the inside of the respective at least one tube element to the outside of the at least one tube element of the frame,
the plurality of independently controllable light sources for generation of light form a display,
the bicycle comprises a light guiding subsystem for guiding of light over a part of the path between at least one light source and the surroundings of the bicycle,
at least one opening is provided in at least one tube element for passing through of the light through the tube wall,
the bicycle comprises configuration means or program code means for rendering of feedback information relating to a subsystem, at least one of: a charge of a drive battery, a status of a bicycle lock, a status of a contact lock function, a status of an alarm function, a status of a tachometer, and/or a status of connection functions of a network connection via a telephone network or a Bluetooth network, and
in that the light generation subsystem is arranged for generating graphical and/or text representations of said rendered bicycle feedback information and displaying said graphical and/or text representations on said display towards a user.

2. The bicycle with light function according to claim 1, wherein the at least one opening comprises a number of openings in an array or in a grid pattern.

3. The bicycle with light function according to claim 1, wherein the light generation subsystem for generating graphical and/or text representations by means of a number of independently controllable light sources functions as a matrix display or dotmatrix display.

4. The bicycle with light function according to claim 1, wherein the light generation subsystem or a part thereof is arranged in at least one cassette that is arrangeable in a respective tube element.

5. The bicycle with light function according to claim 1, wherein the light guiding subsystem comprises a number of light guiding elements and/or lenses.

6. The bicycle with light function according to claim 1, comprising a cover element for covering of at least a part of the openings and/or light guiding elements.

7. The bicycle with light function according to claim 1, wherein a light effect comprises at least one of: continuous illumination, alternating illumination, an animation; as well as information elements for the purpose of a contact lock function or a wheel lock function for locking and unlocking, a bell function, a horn function, an engine level, a startup sequence, a feedback for the purpose of a code input sequence and a charging function for a battery, an error function, a switching on of an alarm, switching off of an alarm, alarming in the event of actions by persons assessed as such.

8. The bicycle with light function according to claim 1, comprising a control unit arranged for receiving of bicycle information of at least one subsystem of the bicycle, wherein the control unit is configured and/or programmed to assemble input information for the light generation subsystem or the light control for generating light and/or light effects by the light generation system in accordance with the input information.

9. The bicycle with light function according to claim 1:
wherein the light generation system comprises a wedge shaped or tapered surface for cooperation with a corresponding wedge shaped or tapered surface of the light guiding subsystem, and wherein the bicycle with light function further comprises:
a sealing foil arranged at the outside of the tube element at the location of the light generation subsystem, and
a sealing means or gluing means for sealing of a space of play between the light guiding subsystem and respective openings in a respective tube element, wherein the light function functions as a display arranged in the surface of a tube element.

10. The bicycle with light function according to claim 1, wherein the plurality of light sources are arranged in the at least one tube element at a mutual distance with respect to each other.

11. The bicycle with light function according to claim 1, wherein a plurality of openings is provided in the at least one tube element for passing through of the light through the tube wall, wherein at least two openings are mutually separated.

12. The bicycle with light function according to claim 11, wherein the plurality of openings is provided in a top tube of the tube assembly.

13. The bicycle with light function according to claim 1, wherein the plurality of independently controllable light sources are arranged in the same tube element.

14. The bicycle with light function according to claim 1, wherein the light guiding subsystem comprises a plurality light translucent areas for allowing light to pass through an opening of the tube element, wherein the light translucent areas are mutually separated by one or more light blocking areas for obstructing light to pass through the opening.

15. Bicycle with light function according to claim 14, wherein the plurality of independently controllable light sources are aligned with the plurality of light translucent areas.

* * * * *